(12) United States Patent
Narisawa et al.

(10) Patent No.: US 12,212,913 B2
(45) Date of Patent: Jan. 28, 2025

(54) EARPHONE DEVICE

(71) Applicant: D&M Holdings, Inc., Kanagawa (JP)

(72) Inventors: Shinya Narisawa, Kanagawa (JP);
Osamu Horikawa, Kanagawa (JP); Jun Shiroishi, Kanagawa (JP)

(73) Assignee: D&M Holdings, Inc., Kanagawa (JP)

( * ) Notice: Subject to any disclaimer, the term of this patent is extended or adjusted under 35 U.S.C. 154(b) by 288 days.

(21) Appl. No.: 17/423,957

(22) PCT Filed: Sep. 19, 2019

(86) PCT No.: PCT/JP2019/036802
§ 371 (c)(1),
(2) Date: Jul. 19, 2021

(87) PCT Pub. No.: WO2020/152907
PCT Pub. Date: Jul. 30, 2020

(65) Prior Publication Data
US 2022/0086555 A1    Mar. 17, 2022

(30) Foreign Application Priority Data
Jan. 25, 2019 (JP) ................. 2019-011462

(51) Int. Cl.
*H04R 1/10* (2006.01)
*G10L 15/22* (2006.01)
*H04R 1/08* (2006.01)

(52) U.S. Cl.
CPC ............ *H04R 1/1041* (2013.01); *G10L 15/22* (2013.01); *H04R 1/08* (2013.01); *H04R 1/1016* (2013.01);
(Continued)

(58) Field of Classification Search
None
See application file for complete search history.

(56) References Cited

U.S. PATENT DOCUMENTS 7,406,179 B2 * 7/2008 Ryan ............... H04R 25/305
381/328
9,615,161 B2   4/2017 Baek et al.
(Continued)

FOREIGN PATENT DOCUMENTS

EP    2770704 B1    4/2016
EP    3089475 B1    12/2018
(Continued)

OTHER PUBLICATIONS

U.S. Appl. No. 62/663,521 corresponding to Wurtz (US20190335267A1) (Year: 2018).*

*Primary Examiner* — James K Mooney
(74) *Attorney, Agent, or Firm* — Nieves IP Law Group, LLC; Peter A. Nieves

(57) ABSTRACT

[Problem] To provide an earphone device with which a user can satisfactorily listen to audio data regardless of the wearing state of an earphone. [Solution] This earphone device 1, which receives audio data wirelessly transmitted through short range wireless communication such as Bluetooth (registered trademark) from a portable music player, a smartphone, or the like, and outputs the received audio data from earphones 2a, 2b, comprises: a volume level control unit 39 that controls a volume level output from the earphones 2a, 2b; and an operation mode switching unit 41 that switches an operation mode of the volume level control unit 39 to one among a normal mode in which the audio data is output from the earphones 2a, 2b at a volume level determined on assumption that the listening is performed in a state in which the earphones 2a, 2b have been placed in the ears, and a speaker mode in which the audio data is output from the earphones 2a, 2b at a volume level which is higher than that in the normal mode and is determined on assump-
(Continued)

tion that the listening is performed in a state in which the earphones 2a, 2b have been removed from the ears.

9 Claims, 5 Drawing Sheets

(52) U.S. Cl.
CPC ........ H04R 1/105 (2013.01); G10L 2015/223 (2013.01); H04R 2420/07 (2013.01); H04R 2430/01 (2013.01)

(56) References Cited

U.S. PATENT DOCUMENTS

| | | | |
|---|---|---|---|
| 2005/0153750 A1 | 7/2005 | Gantz et al. | |
| 2010/0020998 A1* | 1/2010 | Brown | H04R 1/1041 |
| | | | 381/375 |
| 2012/0207318 A1* | 8/2012 | Tsuchiya | H04R 3/00 |
| | | | 381/370 |
| 2013/0170665 A1 | 7/2013 | Wise et al. | |
| 2014/0037101 A1 | 2/2014 | Murata et al. | |
| 2016/0066078 A1* | 3/2016 | Baek | G06F 1/163 |
| | | | 381/74 |
| 2017/0272561 A1* | 9/2017 | Kim | H04M 1/05 |
| 2017/0311073 A1* | 10/2017 | Kang | H04R 1/1016 |
| 2017/0347192 A1 | 11/2017 | Seo et al. | |
| 2019/0335267 A1* | 10/2019 | Wurtz | H04R 1/1008 |

FOREIGN PATENT DOCUMENTS

| | | |
|---|---|---|
| JP | 2001-285982 | 10/2001 |
| JP | 2004-129112 | 4/2004 |
| JP | 2007-013873 | 4/2004 |

* cited by examiner (A)

(B)

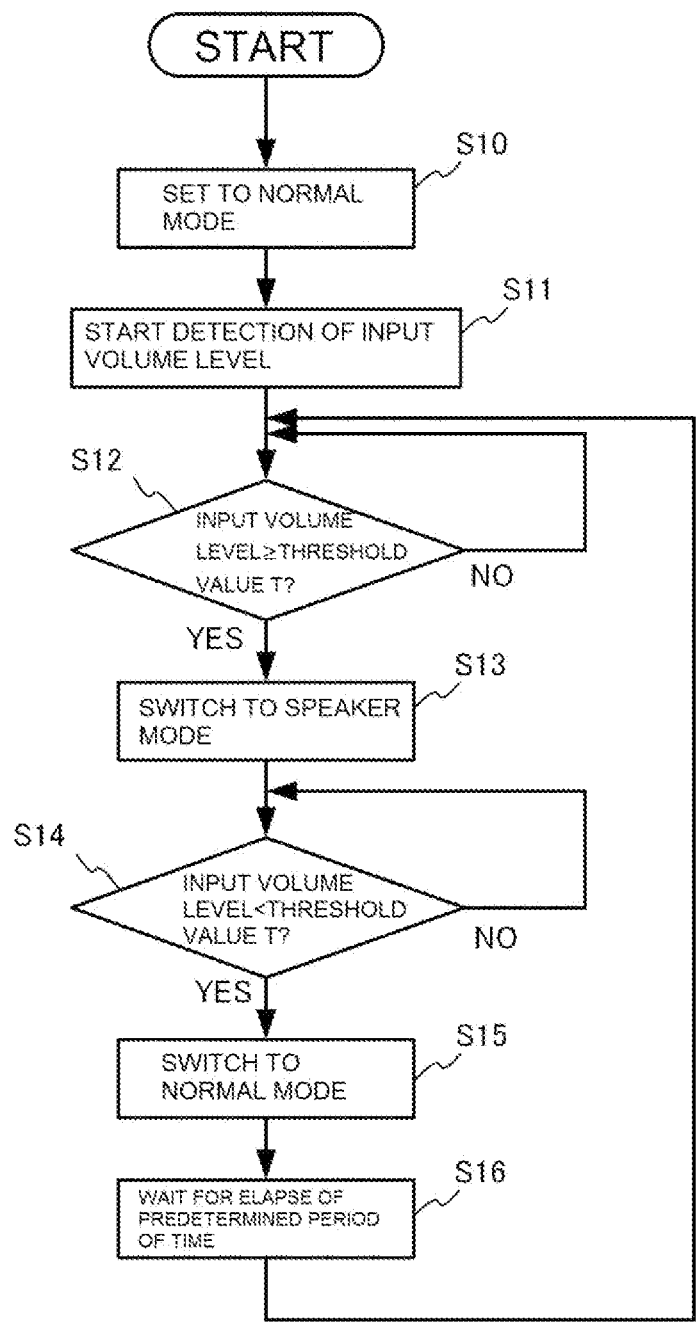

EARPHONE DEVICE

CROSS-REFERENCE TO RELATED APPLICATIONS

This application is the national stage of International Application No. PCT/JP2019/036802, filed Sep. 19, 2019, which claims the benefit of Japanese Patent Application serial number 2019-011462, filed Jan. 25, 2019, entitled "EARPHONE DEVICE," both of which are incorporated by reference herein in their entirety.

TECHNICAL FIELD

The present invention relates to an earphone device, and more particularly, to a neckband-type earphone device.

BACKGROUND ART

An earphone device configured to receive audio data transmitted wirelessly from a portable music player or the like through short-range wireless communication, for example, Bluetooth (trademark), to enable a listener to listen to the audio data with earphones is in widespread use (for example, Patent Literature 1). As the earphone device of this type, there is known a so-called neckband-type earphone device, which includes a neckband to which earphones are connected through cables, and is to be used with this neckband being worn around a listener's neck. Further, the earphone device of this type may include a microphone to have a function as a handset of a smartphone or the like in addition to a function of enabling the listener to listen to the audio data.

CITATION LIST

Patent Literature

[PTL 1] JP 2007-13873 A

SUMMARY OF INVENTION

Technical Problem

Incidentally, the earphone device is used with the earphones being worn on ears, and when a listener uses the earphone device for a long period of time, the listener may feel ear pain and desire to remove the earphones from the ears. In this case, an output volume level of the earphones is based on the premise that the earphones are worn on the ears. Therefore, under a state in which the earphones are removed from the ears, the output volume level of the earphones is too small for the listener to listen to the audio data. Accordingly, when the listener desires to listen to the audio data even under the state in which the earphones are removed from the ears, the listener is required to operate a sound volume of the earphone device or the portable music player or the like to increase the output volume level of the earphones.

Meanwhile, when the listener is enabled to listen to the audio data under the state in which the earphones are removed from the ears, the output volume level of the earphones is too large to wear the earphones on the ears. Therefore, when the listener desires to listen to the audio data with the earphones being worn on the ears, the listener is required to operate the sound volume of the earphone device or the portable music player or the like to decrease the output volume level of the earphones.

As described above, in order to listen to the audio data, it is required to operate the sound volume of the earphone device or the portable music player or the like in accordance with a wearing state of the earphones to adjust the output volume level of the earphones, which is troublesome.

The present invention has been made in view of the above-mentioned circumstances, and has an object to provide an earphone device with which audio data can be satisfactorily listened to regardless of a wearing state of an earphone.

Solution to Problem

In order to solve the above-mentioned problems, in an earphone device according to the present invention, there are prepared, as an operation mode, a normal mode in which audio data is output from an earphone at a volume level assuming a state in which the earphone is worn on an ear, and a speaker mode in which the audio data is output from the earphone at a volume level larger than that in the normal mode, assuming a state in which the earphone is removed from the ear. The operation mode is switchable between the normal mode and the speaker mode.

In this case, determination on a wearing state of the earphone may be made, and the operation mode may be switched in accordance with the determined wearing state. As another example, the operation mode may be switched through recognition of a speech command from a listener.

For example, according to one embodiment of the present invention, there is provided an earphone device configured to output audio data from an earphone, the earphone device including: volume level control means for controlling a volume level to be output from the earphone; and operation mode switching means for switching an operation mode of the volume level control means to any one of a normal mode in which the audio data is output from the earphone at a volume level corresponding to listening under a state in which the earphone is worn on an ear, and a speaker mode in which the audio data is output from the earphone at a volume level which is larger than the volume level in the normal mode, and corresponds to listening under a state in which the earphone is removed from the ear.

Advantageous Effects of Invention

In the present invention, the operation mode is switchable to any one of the normal mode in which the audio data is output from the earphone at the volume level corresponding to the listening under the state in which the earphone is worn on the ear, and the speaker mode in which the audio data is output from the earphone at the volume level, which is larger than the volume level in the normal mode, and corresponds to the listening under the state in which the earphone is removed from the ear. Accordingly, the listener is not required to operate the sound volume in accordance with the wearing state of the earphone to adjust the output volume level of the earphone. Therefore, according to the present invention, the listener can satisfactorily listen to the audio data regardless of the wearing state of the earphone.

BRIEF DESCRIPTION OF DRAWINGS

FIG. 5 is a flow chart for illustrating operation mode switching processing of the neckband 3.

DESCRIPTION OF EMBODIMENTS

Now, one embodiment of the present invention is described with reference to the drawings.

Figure 1:
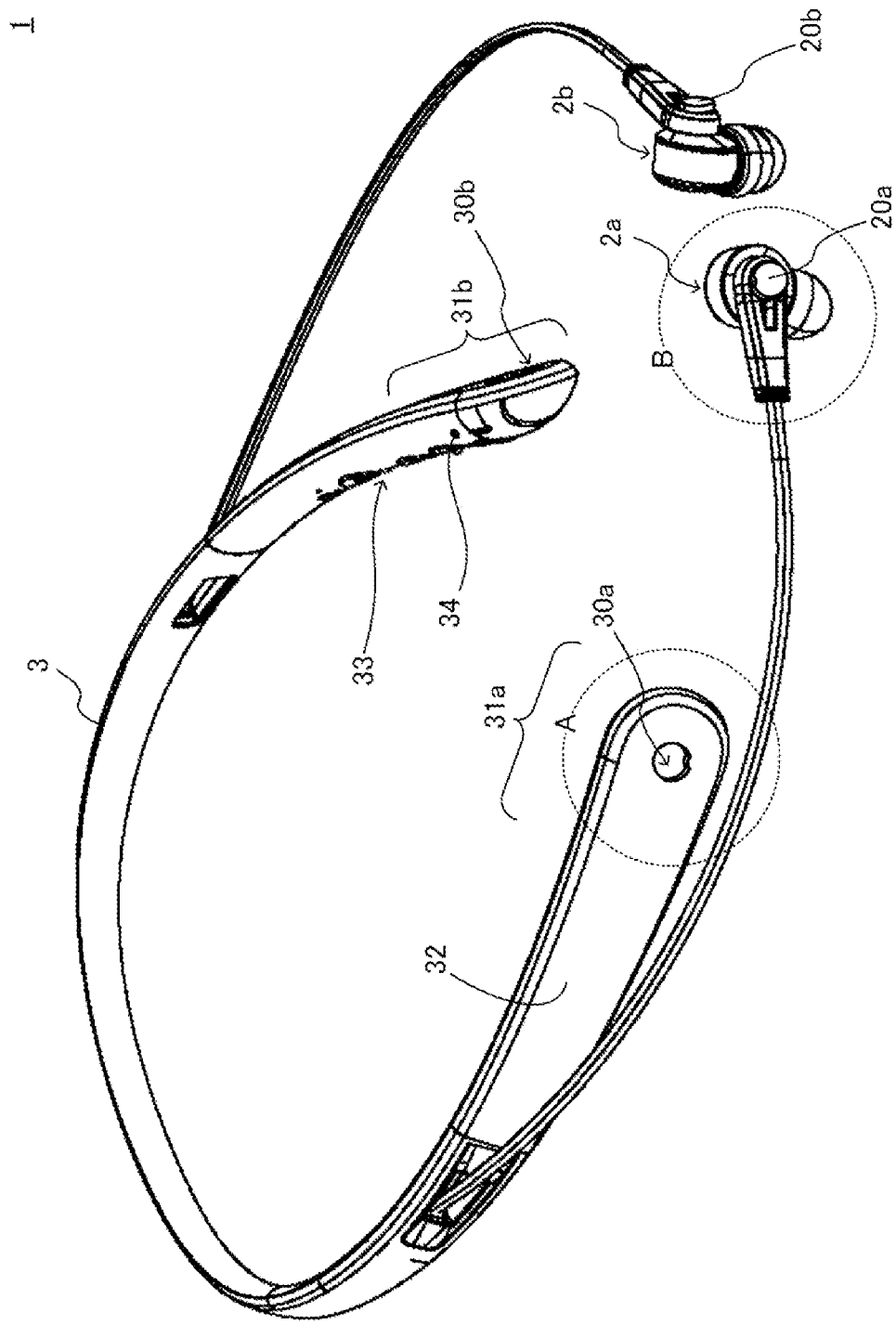
FIG. 1 is an exterior view of an earphone device 1 according to one embodiment of the present invention.
Figure 2:
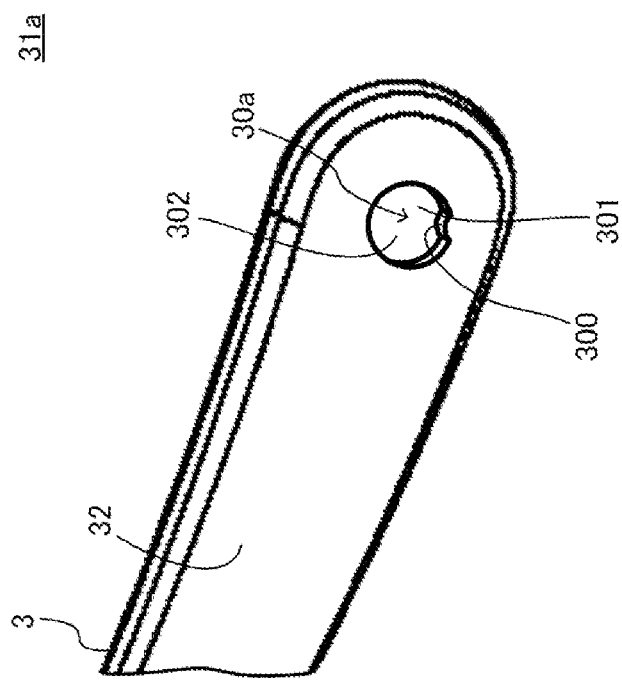
FIG. 2(A) is an enlarged view of a part A of the earphone device 1 illustrated in FIG. 1.
FIG. 2(B) is an enlarged view of a part B of the earphone device 1 illustrated in FIG. 1.
Figure 2:
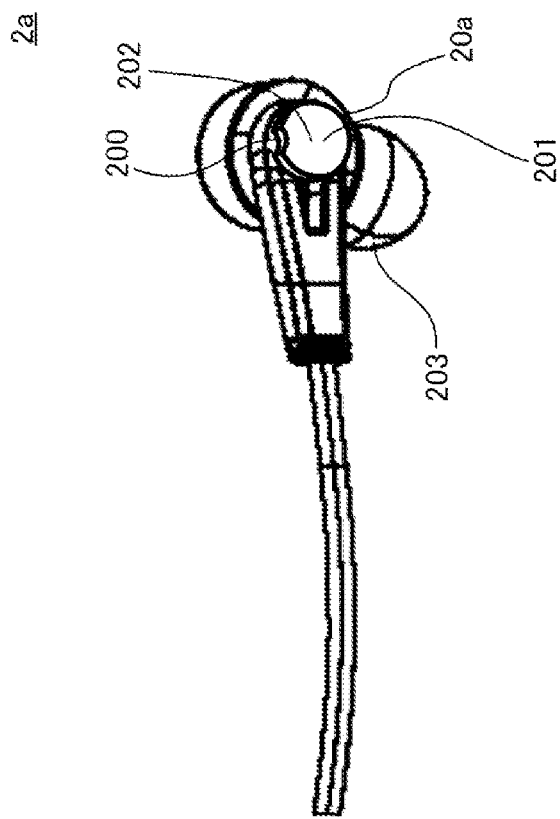

FIG. 1 is an exterior view of an earphone device 1 according to this embodiment. FIG. 2(A) is an enlarged view of a part A of the earphone device 1 illustrated in FIG. 1, and FIG. 2(B) is an enlarged view of a part B of the earphone device 1 illustrated in FIG. 1.

As illustrated in the drawings, the earphone device according to this embodiment is a neckband-type earphone device, and includes a right-ear earphone 2a, a left-ear earphone 2b, and a U-shaped neckband 3 connected to the earphones 2a and 2b through cables. This earphone device 1 is used under a state in which the neckband 3 is worn around a listener's neck, and is configured to receive audio data transmitted wirelessly from a portable music player, a smartphone, or the like through short-range wireless communication, for example, Bluetooth (trademark), and to output the audio data from the earphones 2a and 2b.

On an outer surface 32 of a distal end portion 31a of the neckband 3, which is positioned on the right as viewed from the listener wearing the neckband 3 around his or her neck, a holder (hereinafter also referred to as "right holder") 30a is provided. The holder 30a is configured to detachably hold a held portion 20a of the right-ear earphone 2a. Further, on an outer surface 32 of a distal end portion 31b of the neckband 3, which is positioned on the left as viewed from this listener, a holder (hereinafter also referred to as "left holder") 30b is provided. The holder 30b is configured to detachably hold a held portion 20b of the left-ear earphone 2b.

The right holder 30a is a column-shaped recessed portion having a projection 300 on, for example, an inner peripheral surface thereof, and a magnet 302 is mounted on a bottom surface 301 of the right holder 30a (see FIG. 2(A)). Meanwhile, the held portion 20a of the right-ear earphone 2a is a column-shaped protruding portion, which has a cutout 200 to be engaged with the projection 300 of the right holder 30a in, for example, an outer peripheral surface thereof, and is insertable into the right holder 30a. On a top surface 201 of the held portion 20a, a magnet 202 having a polarity opposite to that of the magnet 302 of the right holder 30a is mounted (see FIG. 2(B)).

Although not shown, similarly, the left holder 30b is a column-shaped recessed portion having a projection 300 on an inner peripheral surface thereof, and a magnet 302 is mounted on a bottom surface 301 thereof. Meanwhile, the held portion 20b of the left-ear earphone 2b is a column-shaped protruding portion, which has a cutout 200 to be engaged with the projection 300 of the left holder 30b in an outer peripheral surface thereof, and is insertable into the left holder 30b. On a top surface 201 of the held portion 20b, a magnet 202 having a polarity opposite to that of the magnet 302 of the left holder 30b is mounted. In this case, the polarities of the magnets 302 of the right holder 30a and the left holder 30b (polarities of the magnets 202 of the held portion 20a of the right-ear earphone 2a and the held portion 20b of the left-ear earphone 2b) are set to be opposite to each other.

Figure 3:
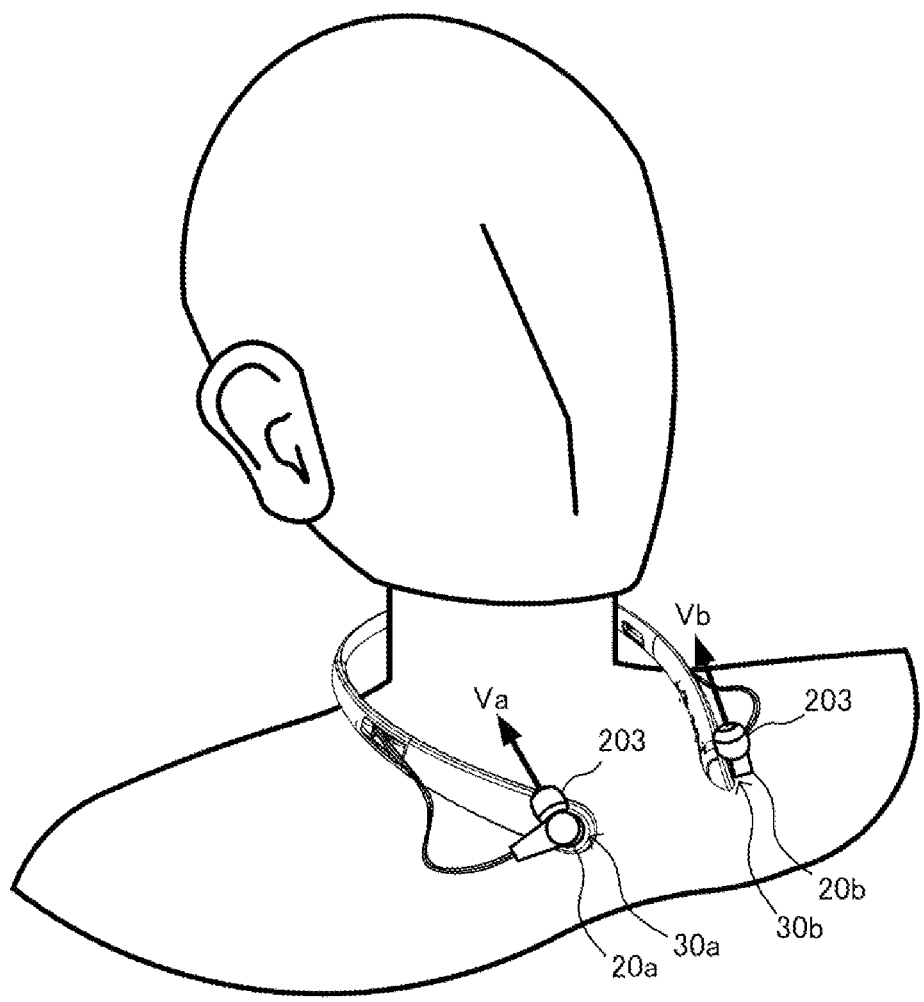
FIG. 3 is a view for illustrating a state in which holders 30a and 30b of a neckband 3 are caused to hold earphones 2a and 2b, respectively, in the earphone device 1 illustrated in FIG. 1.

When the held portion 20a is inserted into the right holder 30a with the cutout 200 of the held portion 20a being engaged with the projection 300 of the right holder 30a, an attractive force is generated by a magnetic force between the magnet 202 of the held portion 20a and the magnet 302 of the right holder 30a, and thus the held portion 20a is attached to the right holder 30a. At this time, the cutout 200 of the held portion 20a is engaged with the projection 300 of the holder 30a, and hence, as illustrated in FIG. 3, the right-ear earphone 2a is fixed in a posture that allows an ear pad 203 to be directed upward so that the sound output from the ear pad 203 is efficiently directed to the listener's right ear (so that a sound output direction Va becomes upward toward the listener's right ear).

Similarly, when the held portion 20b is inserted into the left holder 30b with the cutout 200 of the held portion 20b being engaged with the projection 300 of the left holder 30b, an attractive force is generated by a magnetic force between the magnet 202 of the held portion 20b and the magnet 302 of the left holder 30b, and thus the held portion 20b is attached to the left holder 30b. At this time, the cutout 200 of the held portion 20b is engaged with the projection 300 of the holder 30b, and hence, as illustrated in FIG. 3, the left-ear earphone 2b is fixed in a posture that allows an ear pad 203 to be directed upward so that the sound output from the ear pad 203 is efficiently directed to the listener's left ear (so that a sound output direction Vb becomes upward toward the listener's left ear).

The polarities of the magnets 302 of the right holder 30a and the left holder 30b (polarities of the magnets 202 of the held portion 20a of the right-ear earphone 2a and the held portion 20b of the left-ear earphone 2b) are set to be opposite to each other. When the held portion 20a of the right-ear earphone 2a is inserted into the left holder 30b, a repulsive force is generated by a magnetic force between the magnet 202 of the held portion 20a and the magnet 302 of the holder 30b. Accordingly, the held portion 20a of the right-ear earphone 2a is not attached to the left holder 30b. Similarly, when the held portion 20b of the left-ear earphone 2b is inserted into the right holder 30a, a repulsive force is generated by a magnetic force between the magnet 202 of the held portion 20b and the magnet 302 of the holder 30a. Accordingly, the held portion 20b of the left-ear earphone 2b is not attached to the right holder 30a. In this manner, erroneous attachment of the left-ear earphone 2b to the right holder 30a and erroneous attachment of the right-ear earphone 2a to the left holder 30b can be prevented.

Further, on the neckband 3, an operation unit 33 and a microphone 34 are provided. The operation unit 33 is configured to receive, from the listener, various operations directed to a portable music player, a smartphone, or the like, which is wirelessly connected to the earphone device 1 according to this embodiment.

Figure 4:
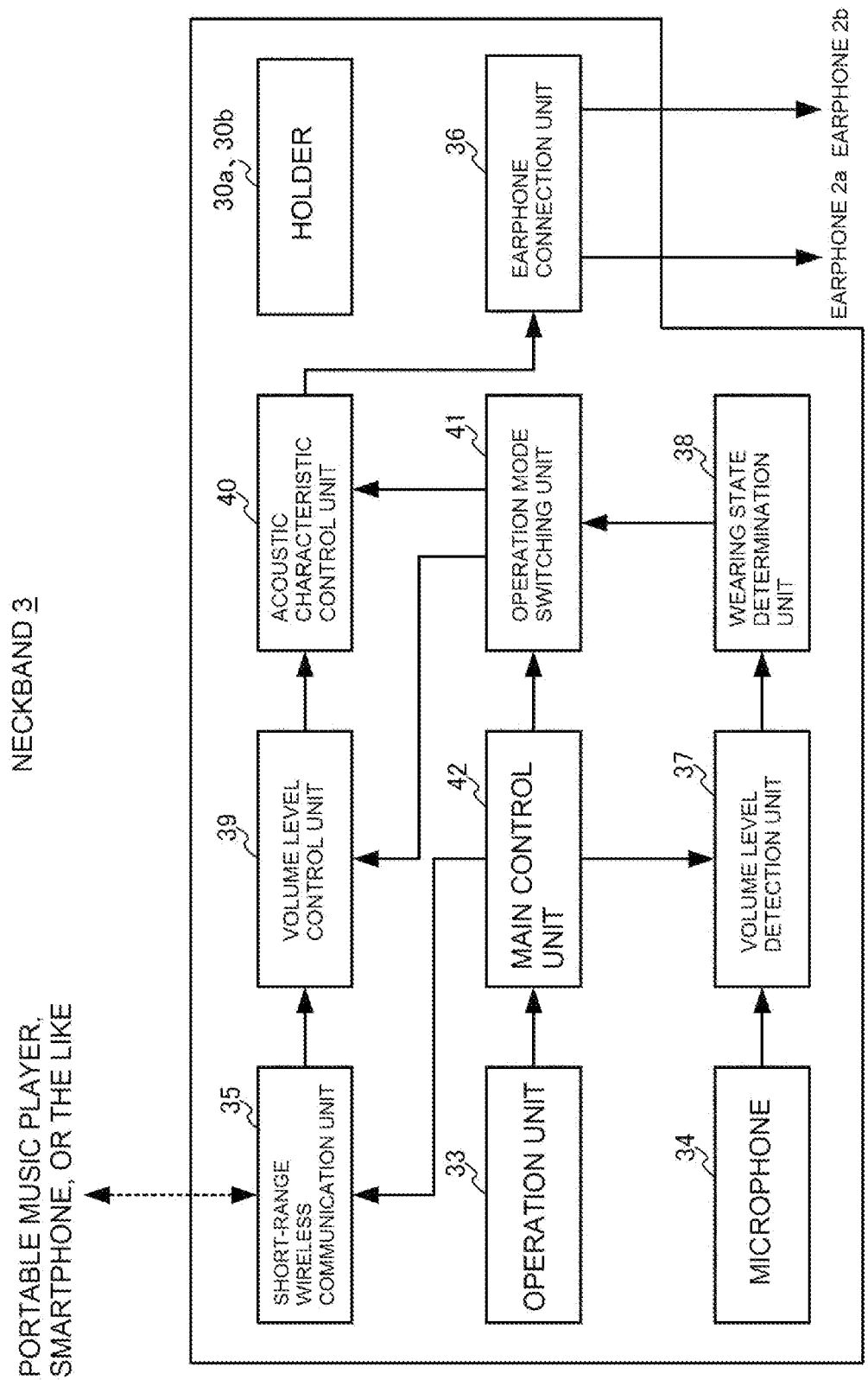
FIG. 4 is a schematic functional configuration diagram of the neckband 3.

FIG. 4 is a schematic functional configuration diagram of the neckband 3.

As illustrated in FIG. 4, the neckband 3 includes, in addition to the holders 30a and 30b, the operation unit 33, and the microphone 34 described above, a short-range wireless communication unit 35, an earphone connection unit 36, a volume level detection unit 37, a wearing state determination unit 38, a volume level control unit 39, an acoustic characteristic control unit 40, an operation mode switching unit 41, and a main control unit 42.

The short-range wireless communication unit 35 is an interface for connection to the portable music player, the smartphone, or the like, through short-range wireless communication, for example, Bluetooth (trademark).

The earphone connection unit 36 is an interface for connection to the earphones 2a and 2b for the respective ears through cables.

The volume level detection unit 37 is configured to detect an input volume level input to the microphone 34.

The wearing state determination unit 38 is configured to determine a wearing state of the earphones 2a and 2b for the respective ears, based on the input volume level input to the microphone 34, which is detected by the volume level detection unit 37. Speakers (not shown) of the earphones 2a and 2b for the respective ears are each surrounded with the ear pad 203. Therefore, under a state in which the earphones 2a and 2b are worn on the right and left ears, respectively, with the ear pads 203 of the earphones 2a and 2b for the respective ears being inserted into respective corresponding earholes, the volume level of the output sound of the earphones 2a and 2b to be detected by the microphone 34 is extremely small. In contrast, under a state in which the earphones 2a and 2b are removed from the right and left ears, respectively, the volume level of the output sound of the earphones 2a and 2b for the respective ears to be detected by the microphone 34 is larger than that detected under the state in which the earphones 2a and 2b are worn on the right and left ears, respectively. In view of this, the wearing state determination unit 38 determines that, when the input volume level input to the microphone 34 detected by the volume level detection unit 37 is smaller than a predetermined threshold value T (for example, 5 db), the earphones 2a and 2b are in a state of being worn on the right and left ears, respectively, and determines that, when the input volume level is equal to or larger than the predetermined threshold value T, the earphones 2a and 2b are in a state of being removed from the right and left ears, respectively.

The volume level control unit 39 is configured to control a volume level of audio data received from the portable music player, the smartphone, or the like via the short-range wireless communication unit 35.

The acoustic characteristic control unit 40 is configured to control an acoustic characteristic (frequency characteristic) of audio data received from the portable music player, the smartphone, or the like via the short-range wireless communication unit 35.

The operation mode switching unit 41 is configured to switch operation modes of the volume level control unit 39 and the acoustic characteristic control unit 40 based on the wearing state of the earphones 2a and 2b determined by the wearing state determination unit 38. Specifically, in a case of a state in which the earphones 2a and 2b are worn on the right and left ears, respectively, the operation mode of the volume level control unit 39 is set to a normal mode in which the audio data is output from the earphones 2a and 2b for the respective ears at a volume level (for example, 30 db) determined assuming listening under the state in which the earphones 2a and 2b are worn on the right and left ears, respectively, and the operation mode of the acoustic characteristic control unit 40 is set to a normal mode in which the audio data is output from the earphones 2a and 2b at an acoustic characteristic determined assuming the listening under the state in which the earphones 2a and 2b are worn on the right and left ears, respectively. Meanwhile, in a case of a state in which the earphones 2a and 2b are removed from the right and left ears, respectively, the operation mode of the volume level control unit 39 is set to a speaker mode in which the audio data is output from the earphones 2a and 2b at a volume level (for example, 50 db) determined to be a value larger than that in the normal mode, assuming listening under the state in which the earphones 2a and 2b are removed from the right and left ears, respectively, and the operation mode of the acoustic characteristic control unit 40 is set to a speaker mode in which the audio data is output from the earphones 2a and 2b for the respective ears at an acoustic characteristic determined so that a low frequency band is more emphasized as compared to the normal mode, assuming the listening under the state in which the listener removes the earphones 2a and 2b from the right and left ears, respectively.

The main control unit 42 is configured to comprehensively control the units of the neckband 3. For example, in accordance with an operation mode setting operation received from the listener via the operation unit 33, the main control unit 42 sets, to the operation mode switching unit 41, the volume level and the acoustic characteristic in the normal mode and the speaker mode of the volume level control unit 39 and the acoustic characteristic control unit 40. Further, the main control unit 42 transmits operation details, for example, a playback operation made for the portable music player, the smartphone, or the like, which are received from the listener via the operation unit 33, to the portable music player, the smartphone, or the like via the short-range wireless communication unit 35.

FIG. 5 is a flow chart for illustrating operation mode switching processing of the neckband 3.

This flow is started when, in accordance with an audio data playback operation received from the listener via the operation unit 33, the main control unit 42 transmits an audio data playback instruction to the portable music player, the smartphone, or the like via the short-range wireless communication unit 35, and is ended when the audio data playback by the portable music player, the smartphone, or the like is ended.

First, the operation mode switching unit 41 sets the operation modes of the volume level control unit 39 and the acoustic characteristic control unit 40 to the normal mode (Step S10). Further, the volume level detection unit 37 starts the detection of the input volume level input to the microphone 34 (Step S11).

Next, the wearing state determination unit 38 monitors the input volume level detected by the volume level detection unit 37 to determine whether or not the input volume level is equal to or larger than the predetermined threshold value T (Step S12). Then, when the input volume level is equal to or larger than the predetermined threshold value T ("YES" in Step S12), the wearing state determination unit 38 determines that the earphones 2a and 2b are in a state of being removed from the right and left ears, respectively, and notifies the operation mode switching unit 41 of this determination result.

In response thereto, the operation mode switching unit 41 switches the operation modes of the volume level control unit 39 and the acoustic characteristic control unit 40 to the speaker mode (Step S13). At this time, it is preferred that the volume level control unit 39 gradually increase the volume level of the audio data and then switch the volume level to the speaker mode, instead of abruptly switching the volume level from the normal mode to the speaker mode.

After that, the wearing state determination unit 38 monitors the input volume level detected by the volume level detection unit 37 to check whether or not the input volume level is smaller than the predetermined threshold value T (Step S14). Then, when the listener starts to prepare for wearing the earphones 2a and 2b on the right and left ears by, for example, closing audio output opening portions (tip parts of the ear pads 203) of the earphones 2a and 2b with his or her fingers, and thus the input volume level becomes smaller than the predetermined threshold value T ("YES" in Step S14), the wearing state determination unit 38 determines that the earphones 2a and 2b are in a state of being worn on the right and left ears, respectively, and notifies the operation mode switching unit 41 of this determination result.

In response thereto, the operation mode switching unit 41 switches the operation modes of the volume level control unit 39 and the acoustic characteristic control unit 40 to the normal mode (Step S15). Then, for a predetermined period of time (for example, 10 seconds), the operation modes are fixed to the normal mode regardless of the input volume level (Step S16), so as to wait until the listener finishes wearing the earphones 2a and 2b on the right and left ears, respectively. Then, the processing returns to Step S12.

Description has been given above of the one embodiment of the present invention.

In this embodiment, the operation mode of the volume level control unit 39 is switchable to any one of the normal mode in which the audio data is output from the earphones 2a and 2b at the volume level determined assuming the listening under the state in which the earphones 2a and 2b are worn on the listener's ears, and the speaker mode in which the audio data is output from the earphones 2a and 2b at the volume level determined to be a value larger than that in the normal mode, assuming the listening under the state in which the earphones 2a and 2b are removed from the listener's ears. Accordingly, the listener is not required to operate the sound volume in accordance with the wearing state of the earphones 2a and 2b to adjust the output volume level of the earphones 2a and 2b. Therefore, according to this embodiment, the listener can satisfactorily listen to the audio data regardless of the wearing state of the earphones 2a and 2b.

Further, in this embodiment, determination on the wearing state of the earphones 2a and 2b is made, and the operation mode of the volume level control unit 39 is switched to any one of the normal mode and the speaker mode based on a result of this determination. Accordingly, the listener can switch the operation mode without inputting a special instruction to the earphone device 1. Therefore, according to this embodiment, the usability of the earphone device 1 can be improved.

Further, in this embodiment, when the input volume level of the microphone 34 is smaller than the predetermined threshold value T, it is determined that the listener is in a state of wearing the earphones 2a and 2b on his or her ears, and when the input volume level is equal to or larger than the predetermined threshold value T, it is determined that the listener is in a state of having the earphones 2a and 2b removed from his or her ears. Accordingly, in the earphone device 1 having a function as a handset of a smartphone or the like in addition to a function of enabling the listener to listen to audio data, a microphone to be used in the handset can also be used as the microphone 34 to suppress an increase in cost.

Further, in this embodiment, on the neckband 3, which is connected to the earphones 2a and 2b through cables, and is to be used by being worn around one's neck, the holders 30a and 30b configured to detachably hold the earphones 2a and 2b, respectively, are provided. Further, the holders 30a and 30b are caused to hold the earphones 2a and 2b so that, when the listener wears the neckband 3 around his or her neck, the sound output directions Va and Vb of the earphones 2a and 2b are directed upward (specifically, in directions toward the listener's ears). Accordingly, at the time of the speaker mode, the audio output from the earphones 2a and 2b can be efficiently delivered to the listener's ears. Therefore, according to this embodiment, at the time of the speaker mode, the listener can satisfactorily listen to the audio data.

Further, in this embodiment, the holders 30a and 30b are caused to detachably hold the earphones 2a and 2b with magnetic forces, respectively. In this case, in the right-ear earphone 2a, an attractive force is generated by a magnetic force with respect to the right holder 30a, while a repulsive force is generated by a magnetic force with respect to the left holder 30b. In the left-ear earphone 2b, an attractive force is generated by a magnetic force with respect to the left holder 30b, while a repulsive force is generated by a magnetic force with respect to the right holder 30a. Therefore, according to this embodiment, erroneous attachment of the right-ear earphone 2a to the left holder 30b and erroneous attachment of the left-ear earphone 2b to the right holder 30a can be prevented.

Further, in this embodiment, in conjunction with the switching of the operation mode of the volume level control unit 39, the operation mode of the acoustic characteristic control unit 40 is switchable to any one of the normal mode in which the audio data is output from the earphones 2a and 2b at the acoustic characteristic determined assuming the listening under the state in which the earphones 2a and 2b are worn on the ears, and the speaker mode in which the audio data is output from the earphones 2a and 2b at the acoustic characteristic determined so that a low frequency region is more emphasized as compared to the normal mode, assuming the listening under the state in which the earphones 2a and 2b are removed from the ears. Therefore, according to this embodiment, the listener can listen to the audio data with a more suitable sound quality regardless of the wearing state of the earphones 2a and 2b.

The present invention is not limited to the above-mentioned embodiment, and various modifications can be made thereto without departing from the gist thereof.

For example, in the above-mentioned embodiment, the wearing state of the earphones 2a and 2b is determined based on the input volume level of the microphone 34, but the present invention is not limited thereto. For example, the earphones 2a and 2b or the holders 30a and 30b may include a pressure sensor, and further include a holding state detection unit configured to determine a holding state of whether the earphones 2a and 2b are held by the holders 30a and 30b, respectively, based on a sensor value of the pressure sensor. Then, the wearing state determination unit 38 may determine that, when a holding state determination result obtained by the holding state detection unit indicates a state in which the earphones 2a and 2b are not held by the holders 30a and 30b, respectively, the listener is in a state of wearing the earphones 2a and 2b on his or her ears, and determine that, when the holding state determination result indicates a state in which the earphones 2a and 2b are held by the holders 30a and 30b, respectively, the listener is in a state of having the earphones 2a and 2b removed from his or her ears.

Further, in the above-mentioned embodiment, the operation modes of the volume level control unit 39 and the acoustic characteristic control unit 40 are switched based on the wearing state of the earphones 2a and 2b, but the present invention is not limited thereto. For example, the neckband 3 may include a built-in speech recognition processing unit.

In this manner, during the playback of the audio data by the portable music player, the smartphone, or the like, input speech of the microphone 34 may be subjected to speech recognition processing to monitor whether or not the listener has spoken a predetermined speech command for switching the operation mode. When the predetermined speech command is detected, the operation mode may be switched.

Further, in the above-mentioned embodiment, the projections 300 provided on the holders 30a and 30b are engaged with the cutouts 200 of the held portions 20a and 20b of the earphones 2a and 2b, respectively, so that the earphones 2a and 2b are fixed in postures that allow the sound to be efficiently directed to the listener's ears (postures that allow the sound output directions Va and Vb to be directed upward toward the listener's ears). However, the present invention is not limited thereto. The holders 30a and 30b and the held portions 20a and 20b of the earphones 2a and 2b may have any shape as long as the earphones 2a and 2b can be fixed in postures that allow the sound to be efficiently directed to the listener's ears (postures that allow the sound output directions Va and Vb to be directed upward toward the listener's ears). For example, cutouts may be formed in the holders 30a and 30b, and projections may be provided on the held portions 20a and 20b of the earphones 2a and 2b. Further, the holders 30a and 30b and the held portions 20a and 20b of the earphones 2a and 2b may have a heart shape so that, while preventing the rotation of the held portions 20a and 20b of the earphones 2a and 2b attached to the holders 30a and 30b, respectively, the earphones 2a and 2b are fixed in postures that allow the sound to be efficiently directed to the listener's ears (postures that allow the sound output directions Va and Vb to be directed upward toward the listener's ears). Further, instead of using the cutouts 200 and the projections 300, the magnets 302 may be arranged in parts of the inner peripheral surfaces of the holders 30a and 30b, and the magnets 202 may be arranged in parts of the outer peripheral surfaces of the held portions 20a and 20b of the earphones 2a and 2b. In this manner, the directions of the earphones 2a and 2b accommodated in the holders 30a and 30b may be adjusted by a force of attraction between both of the magnets 202 and 302.

Further, in the above-mentioned embodiment, both of the earphones 2a and 2b and the holders 30a and 30b are provided with the magnets 202 and 302, respectively, but the present invention is not limited thereto. One of the earphones 2a and 2b and the holders 30a and 30b may be provided with a magnetic body, for example, an iron plate, in place of the magnet. Further, in the above-mentioned embodiment, the holders 30a and 30b are caused to detachably hold the earphones 2a and 2b with magnetic forces, respectively, but the present invention is not limited thereto. For example, the held portions 20a and 20b of the earphones 2a and 2b may be formed of an elastic member made of, for example, rubber, and the held portions 20a and 20b may be press-fitted into the holders 30a and 30b so as to cause the holders 30a and 30b to detachably hold the earphones 2a and 2b, respectively. As another example, the holders 30a and 30b may be formed of an elastic member made of, for example, rubber, and the held portions 20a and 20b of the earphones 2a and 2b may be press-fitted into the holders 30a and 30b so as to cause the holders 30a and 30b to detachably hold the earphones 2a and 2b, respectively.

In those cases, in order to prevent erroneous attachment of the right-ear earphone 2a to the left holder 30b and erroneous attachment of the left-ear earphone 2b to the right holder 30a, an attachment part between the right-ear earphone 2a and the right holder 30a and an attachment part between the left-ear earphone 2b and the left holder 30b may have shapes different from each other. For example, a projecting portion is further formed on a side surface of the held portion 20a of the right-ear earphone 2a, and a groove portion to be engaged with the projecting portion of the held portion 20a is further formed in an inner side surface of the right holder 30a. Further, a projecting portion is further formed on a side surface of the held portion 20b of the left-ear earphone 2b, and a groove portion to be engaged with the projecting portion of the held portion 20b is further formed in a side surface of the left holder 30b. Further, a positional relationship between the projecting portion and the cutout 200 in the held portion 20a of the right-ear earphone 2a and a positional relationship between the projecting portion and the cutout 200 in the held portion 20b of the left-ear earphone 2b are set to be different from each other.

Further, the functional configuration of the earphone device 1 illustrated in FIG. 4 may be implemented in the form of hardware by an integrated logic IC such as an application specific integrated circuit (ASIC) or a field programmable gate array (FPGA), or may be implemented in the form of software by a computer such as a digital signal processor (DSP) or a microcomputer.

Further, the present invention is applicable not only to a binaural earphone device for right and left ears, but also to a monaural earphone device. Further, the present invention is not limited to a neckband-type earphone device, and is applicable to earphone devices of various types.

REFERENCE SIGNS LIST

1: earphone device, 2a, 2b: earphone, 3: neckband, 20a, 20b: held portion, 30a, 30b: holder, 31a, 31b: distal end portion of neckband 3, 32: outer surface of neckband 3, 33: operation unit, 34: microphone, 35: short-range wireless communication unit, 36: earphone connection unit, 37: volume level detection unit, 38: wearing state determination unit, 39: volume level control unit, 40: acoustic characteristic control unit, 41: operation mode switching unit, 42: main control unit, 200: cutout of held portion 20a, 20b, 201: top surface of held portion 20a, 20b, 202, 302: magnet, 203: ear pad, 300: projection of holder 30a, 30b, 301: bottom surface of holder 30a, 30b

DRAWINGS

FIG. 4
2a, 2b EARPHONE
3 NECKBAND
30a, 30b HOLDER
33 OPERATION UNIT
34 MICROPHONE
35 SHORT-RANGE WIRELESS COMMUNICATION UNIT
36 EARPHONE CONNECTION UNIT
37 VOLUME LEVEL DETECTION UNIT
38 WEARING STATE DETERMINATION UNIT
39 VOLUME LEVEL CONTROL UNIT
40 ACOUSTIC CHARACTERISTIC CONTROL UNIT
41 OPERATION MODE SWITCHING UNIT
42 MAIN CONTROL UNIT
PORTABLE MUSIC PLAYER, SMARTPHONE, OR THE LIKE
FIG. 5
S10 SET TO NORMAL MODE
S11 START DETECTION OF INPUT VOLUME LEVEL

S12 INPUT VOLUME LEVEL≥THRESHOLD VALUE T?
S13 SWITCH TO SPEAKER MODE
S14 INPUT VOLUME LEVEL<THRESHOLD VALUE T?
S15 SWITCH TO NORMAL MODE
S16 WAIT FOR ELAPSE OF PREDETERMINED PERIOD OF TIME
(1) OPERATION MODE SWITCHING PROCESSING
(2) START

The invention claimed is:

1. An earphone device configured to output audio data from an earphone, the earphone device comprising:
    volume level control means for controlling a volume level to be output from the earphone;
    operation mode switching means for switching an operation mode of the volume level control means to any one of a normal mode in which the audio data is output from the earphone at a volume level corresponding to listening under a state in which the earphone is worn on an ear, and a speaker mode in which the audio data is output from the earphone at a volume level which is larger than the volume level in the normal mode, and corresponds to listening under a state in which the earphone is removed from the ear;
    wearing state determination means for determining a wearing state of the earphone, wherein the operation mode switching means is configured to switch the operation mode of the volume level control means based on the wearing state of the earphone determined by the wearing state determination means;
    a microphone; and
    volume level detection means for detecting an input volume level input to the microphone,
        wherein the wearing state determination means is configured to determine that, when the input volume level detected by the volume level detection means is smaller than a predetermined value, the earphone is in a state of being worn on the ear, and determine that, when the input volume level detected by the volume level detection means is equal to or larger than the predetermined value, the earphone is in a state of being removed from the ear.

2. The earphone device according to claim 1, further comprising:
    a holder configured to detachably hold the earphone; and
    holding state detection means for detecting a holding state of whether the earphone is held by the holder,
    wherein the wearing state determination means is configured to determine that, when the holding state detected by the holding state detection means indicates a state in which the earphone is not held by the holder, the earphone is in a state of being worn on the ear, and determine that, when the holding state detected by the holding state detection means indicates a state in which the earphone is held by the holder, the earphone is in a state of being removed from the ear.

3. The earphone device according to claim 2, further comprising a neckband, which is connected to the earphone through a cable, and is to be used by being worn around a neck,
    wherein the holder is provided on the neckband, and
    wherein the holder is configured to hold the earphone so that, when the neckband is worn around the neck, a sound output direction of the earphone is directed upward.

4. The earphone device according to claim 1, further comprising
    speech command recognition means for recognizing a predetermined speech command input to the microphone,
    wherein the operation mode switching means is configured to switch the operation mode of the volume level control means based on the predetermined speech command recognized by the speech command recognition means.

5. The earphone device according to claim 1, further comprising a neckband, which is connected to the earphone through a cable, and is to be used by being worn around a neck,
    wherein the neckband includes a holder configured to detachably hold the earphone, and
    wherein the holder is configured to hold the earphone so that, when the neckband is worn around the neck, a sound output direction of the earphone is directed upward.

6. The earphone device according to claim 5, wherein the earphone is detachably held by the holder with a magnetic force.

7. The earphone device according to claim 6,
    wherein the earphone and the holder comprise a left-ear earphone and a left-ear holder, respectively,
    wherein the earphone and the holder comprise a right-ear earphone and a right-ear holder, respectively,
    wherein, in the left-ear earphone, an attractive force is generated by a first magnetic force with respect to the left-ear holder, and a repulsive force is generated by a second magnetic force with respect to the right-ear holder, and
    wherein, in the right-ear earphone, an attractive force is generated by a third magnetic force with respect to the right-ear holder, and a repulsive force is generated by a magnetic force with respect to the left-ear holder.

8. The earphone device according to claim 5, wherein the earphone is detachably held by the holder through press-fitting of an elastic member.

9. The earphone device according to claim 1, further comprising acoustic characteristic control means for controlling an acoustic characteristic of the audio data to be output from the earphone,
    wherein the operation mode switching means is configured to switch, together with the operation mode of the volume level control means, an operation mode of the acoustic characteristic control means to any one of a normal mode in which the audio data is output from the earphone at an acoustic characteristic corresponding to the listening under the state in which the earphone is worn on the ear, and a speaker mode in which the audio data is output from the earphone at an acoustic characteristic, in which a low frequency region is emphasized as compared to the normal mode, and which corresponds to the listening under the state in which the earphone is removed from the ear.

* * * * *